(12) United States Patent
Licitar (10) Patent No.: US 12,479,026 B2
(45) Date of Patent: Nov. 25, 2025

(54) APPARATUSES AND METHODS FOR PRODUCING NANOPARTICLES FROM MATERIAL IN WORKING LIQUID

(71) Applicant: Antonijo Licitar, Zagreb (HR)

(72) Inventor: Antonijo Licitar, Zagreb (HR)

( * ) Notice: Subject to any disclaimer, the term of this patent is extended or adjusted under 35 U.S.C. 154(b) by 0 days.

(21) Appl. No.: 18/910,503

(22) Filed: Oct. 9, 2024

(65) Prior Publication Data

US 2025/0196225 A1 Jun. 19, 2025

(30) Foreign Application Priority Data

Dec. 15, 2023 (EP) ..................... 23217348

(51) Int. Cl.
| | | |
|---|---|---|
| *B22F 9/08* | (2006.01) | |
| *B22F 1/054* | (2022.01) | |
| *B82Y 40/00* | (2011.01) | |

(52) U.S. Cl.
CPC ............... *B22F 9/08* (2013.01); *B22F 1/054* (2022.01); *B82Y 40/00* (2013.01)

(58) Field of Classification Search
CPC .... B22F 1/00; B22F 1/05; B22F 1/054; B22F 9/00; B22F 9/02; B22F 9/06; B22F 9/08
See application file for complete search history.

(56) References Cited

U.S. PATENT DOCUMENTS

| | | | |
|---|---|---|---|
| 11,154,868 B2 * | 10/2021 | Licitar | ............... B02C 17/1855 |
| 2011/0182805 A1 * | 7/2011 | DeSimone | ............ G03F 7/0002 |
| | | | 424/9.4 |

FOREIGN PATENT DOCUMENTS

| | | | | |
|---|---|---|---|---|
| GB | 260034 | * | 10/1926 | ............. B02C 13/22 |

* cited by examiner

*Primary Examiner* — Natasha E Young
(74) *Attorney, Agent, or Firm* — DLA Piper LLP (US)

(57) ABSTRACT

The present disclosure relates to apparatuses for producing nanoparticles from a material in a working liquid and optionally to produce hydrogen, and to top-down methods for producing nanoparticles and optionally hydrogen using such apparatuses. A core of such an apparatus can include a first disc and a second disc including holes arranged in concentric rings and channel portions between those rings. The first disc and the second disc are arranged such that the channels of each disc face the rings of the other disc.

20 Claims, 6 Drawing Sheets

APPARATUSES AND METHODS FOR PRODUCING NANOPARTICLES FROM MATERIAL IN WORKING LIQUID

CROSS-REFERENCE TO RELATED APPLICATIONS

This application claims priority to European Application No. 23217348.4 filed on Dec. 15, 2023, which is hereby incorporated by reference in its entirety.

FIELD

The present disclosure relates to apparatuses for producing particles, particularly nanoparticles, as well as top-down methods for producing particles using such apparatuses. The apparatuses of the present disclosure may process materials in a working liquid.

BACKGROUND

Nanoparticles have at least one of their dimensions, optionally all their dimensions, between 1 nm and 100 nm. As the surface area to volume ratio of the material increases in the nanoscale, the properties of the nanoparticles may be different from the properties of larger particles. Nanoparticles are used in a wide range of fields, for example, medicine, electronics, materials science, and others.

One known method for obtaining nanoparticles involves a mechanical mill, disclosed in U.S. Pat. Nos. 11,154,868 B2 and 11,607,693 B2, which are incorporated by reference herein in their entirety. In these documents, two rotors including aerodynamical blades which can be rotated in opposite directions are described. However, it has been discovered that these designs are not capable of producing more than about 5% of nanoparticles from the input material. Additionally, blade damage and abrasion occur which further reduce the efficiency of these systems. The input material collides with the blades and is broken down due to the collisions with the blades and deteriorating the blades themselves. The material removed from the blades may contaminate the environment and may produce nanoparticles which include impurities.

There remains a need for systems and methods that can efficiently produce nanoparticles with minimal impurities and reduced damage to the system. The present disclosure aims at resolving and reducing one or more of the above mentioned disadvantages.

SUMMARY

In some aspects, the techniques described herein relate to an apparatus for producing nanoparticles of a material in a working liquid, including: one or more inlets for introducing the working liquid, the material, or a combination thereof into the apparatus; a core for accelerating the working liquid and the material, wherein the core includes: a first disc and a second disc facing the first disc in an axial direction; wherein the first disc and the second disc each include: a plurality of concentric rings; a plurality of concentric channels alternately interleaved with the plurality of concentric rings; a plurality of holes extending from the plurality of concentric channels and the plurality of concentric rings at an angle of 2° to 89° with respect to the axial direction; wherein the plurality of concentric rings of the first disc are arranged facing the plurality of concentric channels of the second disc; wherein the plurality of concentric rings of the second disc are arranged facing the plurality of concentric channels of the first disc; and one or more drives for rotating the first disc, the second disc, or a combination thereof.

In some aspects, the techniques described herein relate to an apparatus, wherein the plurality of holes each have a substantially elliptical cross-section.

In some aspects, the techniques described herein relate to an apparatus, wherein the plurality of holes extend at an angle of 20° to 80° with respect to the axial direction.

In some aspects, the techniques described herein relate to an apparatus, wherein the plurality of holes are blind holes.

In some aspects, the techniques described herein relate to an apparatus, wherein the plurality of holes are through holes.

In some aspects, the techniques described herein relate to an apparatus, wherein the first disc, the second disc, or a combination thereof further include an opening for introducing the working liquid between the first disc and the second disc.

In some aspects, the techniques described herein relate to an apparatus, wherein the one or more drives are configured to rotate the first disc in a first direction and the second disc in a second direction opposite to the first direction.

In some aspects, the techniques described herein relate to an apparatus, further including a separator system for separating the material from the working liquid.

In some aspects, the techniques described herein relate to an apparatus, further including a collector system configured to collect the produced nanoparticles after separation of the nanoparticles from the working liquid.

In some aspects, the techniques described herein relate to an apparatus, wherein a pitch of the plurality of holes of the first disc, the second disc, or a combination thereof increases from a radially most inner portion towards a radially most outer portion of the respective disc.

In some aspects, the techniques described herein relate to an apparatus, wherein a size of the holes of the first disc, the second disc, or a combination thereof decreases from a most radially inner portion towards a most radially outer portion of the respective disc.

In some aspects, the techniques described herein relate to an apparatus, wherein the first disc, the second disc, or a combination thereof include a ceramic material.

In some aspects, the techniques described herein relate to a method of producing nanoparticles of a material in a working liquid, including: introducing the material and the working liquid into the core of an apparatus including: a core for accelerating the working liquid and the material, wherein the core includes: a first disc and a second disc facing the first disc in an axial direction; wherein the first disc and the second disc each include: a plurality of concentric rings; a plurality of concentric channels alternately interleaved with the plurality of concentric rings; a plurality of holes extending from the plurality of concentric channels and the plurality of concentric rings at an angle of 2° to 89° with respect to the axial direction; wherein the plurality of concentric rings of the first disc are arranged facing the plurality of concentric channels of the second disc; wherein the plurality of concentric rings of the second disc are arranged facing the plurality of concentric channels of the first disc; rotating the first disc, the second disc, or a combination thereof of the core; accelerating the working liquid to cause a cavitation effect; and changing a flow direction of the working liquid to cause a water hammer effect; thereby producing nanoparticles of the material.

In some aspects, the techniques described herein relate to a method, wherein the material includes an oxidizable metallic material.

In some aspects, the techniques described herein relate to a method, wherein the material includes silicon, aluminum, calcium, magnesium, iron, zinc, or combinations thereof.

In some aspects, the techniques described herein relate to a method, wherein the working liquid includes water.

In some aspects, the techniques described herein relate to a method, further including generating hydrogen.

In some aspects, the techniques described herein relate to a method, further including generating syngas, methane, carbon monoxide, carbon dioxide, oxygen, or combinations thereof.

In some aspects, the techniques described herein relate to a method, further including setting an atmosphere inside the core.

In some aspects, the techniques described herein relate to a method, further including adding one or more additives to the working liquid and the material.

BRIEF DESCRIPTION OF THE DRAWINGS

Aspects, features, benefits, and advantages of the embodiments described herein will be apparent with regard to the following description, appended claims, and accompanying drawings where:

DETAILED DESCRIPTION

The present disclosure describes systems and methods for producing nanoparticles of a material in a working liquid. The production of nanoparticles is a commercially valuable process, as many high-value materials are desired at the nanoparticle-scale. The present disclosure describes systems and methods which can efficiently produce nanoparticles with few defects while also minimizing damage to the apparatus and components. The present apparatuses and methods are specifically configured to operate efficiently with liquid materials, or materials suspended in a liquid, which aims to overcome a deficiency in prior systems which may be optimized for operation with dry materials only.

Apparatus for Producing Nanoparticles

In embodiments, there is provided an apparatus for producing nanoparticles of a material in a working liquid, including: one or more inlets for introducing the working liquid, the material, or a combination thereof into the apparatus; a core for accelerating the working liquid and the material, wherein the core includes a first disc and a second disc facing the first disc in an axial direction; wherein the first disc and the second disc each include a plurality of concentric rings; a plurality of concentric channels alternately interleaved with the plurality of concentric rings; a plurality of holes extending from the plurality of concentric channels and the plurality of concentric rings at an angle of 2° to 89° with respect to the axial direction; wherein the plurality of concentric rings of the first disc are arranged facing the plurality of concentric channels of the second disc; wherein the plurality of concentric rings of the second disc are arranged facing the plurality of concentric channels of the first disc; and one or more drives for rotating the first disc, the second disc, or a combination thereof.

Other examples of apparatuses and methods for producing nanoparticles of a material can be found in European Patent Application Nos. 23382949, 23217346, and 23383307, all of which are incorporated by reference herein in their entirety.

In embodiments, the working liquid can include water (including sea water, waste water, or other non-potable water source), fuels such as diesel, bio diesel, or gasoline, or other liquids which are suitable for suspending a material therein. That is, the working liquid should not chemically react with the material. In embodiments, the material can include an oxidizable metallic material such as metals including iron, aluminum, calcium, magnesium, zinc, and the like, as well as metalloids such as silicon. In embodiments, the material can include minerals or composites including the aforementioned elements. The material itself is not particularly limited and may include a material which has an initial particle size, wherein the material is reduced to a smaller size after the material is processed using the apparatus of the present disclosure. Further details regarding the material and the working liquid are provided in later sections of this disclosure.

In embodiments, the working liquid and the material can be introduced to the apparatus together or separately. Further details are provided in later sections of this disclosure.

Figure 1:
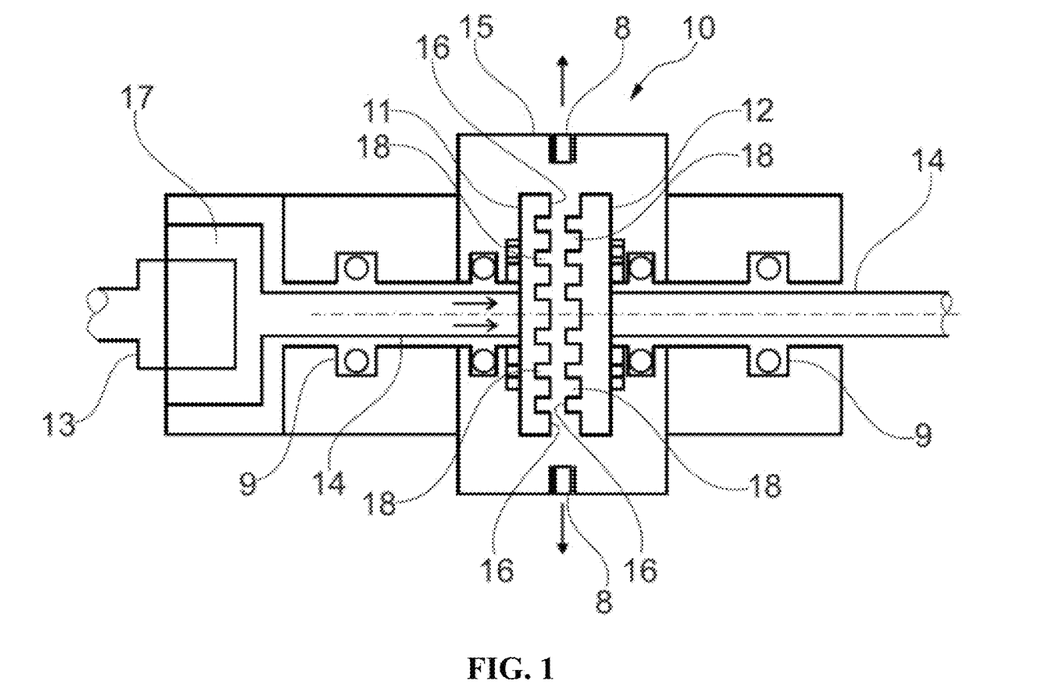
FIG. 1 schematically illustrates a cross-sectional view of an example of a core for accelerating a working liquid comprising a material, according to an embodiment of the present disclosure.

FIG. 1 schematically illustrates a cross-sectional view of a core 10 for accelerating a working liquid including a material, colliding the material with itself, achieving the water hammer effect and the cavitation effect, and producing nanoparticles. Such a core may be used in an apparatus for producing nano particles. The cross-section is taken in a plane which includes the axial and radial directions of the core.

In embodiments, the core 10 can include a first disc 11 and a second opposite disc 12 facing the first disc 11 in an axial direction. The apparatus in which the core 10 is included can further include one or more drives 13 for rotating the first disc 11 and/or the second disc 12. In the embodiment of this figure, a single drive 13 is illustrated, but another drive for rotating the second disc 12 may also be provided.

In embodiments, the first disc 11 and the second disc 12 can include a plurality of concentric rings 16. The first disc 11 and the second disc 12 further include a plurality of concentric channels 18 alternately interleaved with the plurality of concentric rings 16. The first disc 11 and the second disc 12 can include a plurality of holes (not shown in this figure, see FIGS. 2 and 5) extending from the concentric channels 18 and the concentric rings 16 at an angle of about 2° to about 89° with respect to the axial direction, such as about 2°, about 5°, about 10°, about 15°, about 20°, about 25°, about 30°, about 35°, about 40°, about 45°, about 50°, about 55°, about 60°, about 65°, about 70°, about 75°, about 80°, about 85°, about 89°, or any value contained within a range formed by any two of the preceding values.

In embodiments, the concentric rings 16 of the first disc 11 are arranged facing the channels 18 of the second disc 12. The concentric rings 16 of the second disc 12 are arranged facing the channels 18 of the first disc 16.

Therefore, in a disc of the core, rings are alternated with channels. In embodiments, the is a difference in height, herein measured along the axial direction of the core, between the base of a channel and the base of a ring. The rings and the channels are provided with holes which are inclined with respect to the axial direction of the core.

In embodiments, both discs may be rotated. For example, the drives may be configured to rotate the first disc in a first direction and the second disc in a second direction opposite to the first direction. This configuration may help to promote collisions of the material within the working liquid. In other embodiments, both discs may be rotated in the same direction, but at different rotational speeds. Still in other embodiments, one of the discs may be rotated, while the other is static, that is, not rotated. Rotation of at least one disc may be performed at greater than or equal to about 25,000 revolutions per minute (rpm) in some embodiments, such as about 40,000 rpm, about 45,000 rpm, and so forth.

In embodiments, a radius of the first disc and the second disc may be about 100 mm to about 1500 mm or more, such as about 100 mm, about 200 mm, about 300 mm, about 500 mm, about 1000 mm, about 1500 mm, or any value contained within a range formed by any two of the preceding values. In embodiments, one of the discs may have at least five channels and the other disc may have at least four channels.

In embodiments, suitable drives or actuators may be provided for rotating at least one of the discs. For example, one or more motors, a gas-powered system, an electromagnetically powered system, the like, or combinations thereof may be used for rotating one or more of the discs. In embodiments, a flywheel may be connected to the disc(s) to be rotated for reducing mechanical stress during operation.

Therefore, when at least one of the first disc and the second disc is rotated, the working liquid is accelerated, and a cavitation effect and a water hammer effect can be achieved for reducing a size of the material in the working liquid. The cavitation effect and the water hammer effect also help to collide material. When the working liquid is accelerated, low pressure regions may arise and vapor bubbles, also known as cavities or voids, may be formed in the low pressure regions. Some of the material may be trapped inside the bubbles. In particular, the vapor bubbles form when the pressure of the liquid is reduced below the vapor pressure of the liquid. When the bubbles reach regions of higher pressure, they collapse and produce shock waves. The material inside and near the bubbles may therefore be reduced to a smaller size due to the shock waves and due to collision with itself. Such a cavitation effect may specifically occur within or near the holes of the discs. The holes in the rings and channels may further promote the formation of bubbles.

In embodiments, when the working liquid is accelerated and its direction of flow changes suddenly, such as due the presence of the rings, channels, and holes of the apparatus, a pressure wave can be produced. The pressure wave may help to break down the material as well as to promote that it collides with itself. In this regard, the pressure waves may cause a turbulent flow, which may enhance material collision. The water hammer effect, also known as hydraulic shock, may therefore also help to reduce a size of the material inside the working liquid.

In embodiments, the rotation of at least one of the discs may also cause the material in the working liquid to collide with itself, thereby reducing its size. For example, collisions of material with itself may occur in a region between a channel and a ring.

Figure 2:
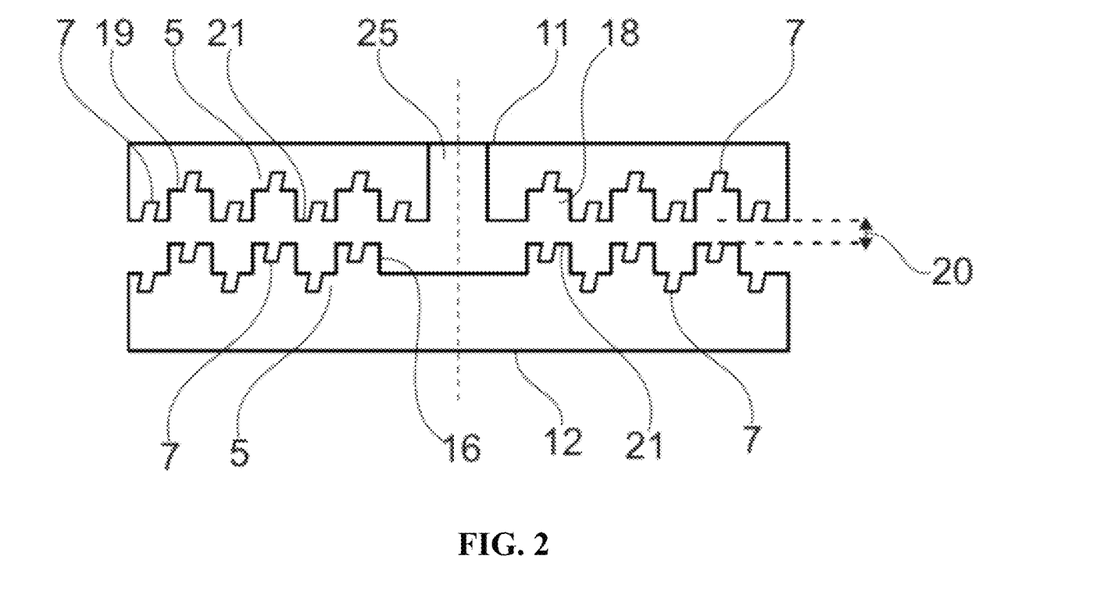
FIG. 2 schematically illustrates a cross-section of an example of a first disc and a second disc facing each other, according to an embodiment of the present disclosure.

In embodiments, a gap in an axial direction may be provided between a base of the rings of one disc and a base of the rings of the other disc, see also FIG. 2. Such a gap may, for example, be less than or equal to about 500 microns.

In embodiments, the core can include one or more inlets through which the working liquid and the material may be introduced to the core. The working liquid and the material can be introduced to the core separately or simultaneously.

As a working liquid is to be introduced in the core, the core should be liquid tight for avoiding leakages and damage to the surrounding elements of the apparatus. In embodiments, a non-contact coupling between a drive for rotating a shaft and the shaft connected to the corresponding disc may be provided. In embodiments, a suitable non-contact coupling may include a magnetic coupling. A magnetic coupling may, for example, include permanent magnets, electromagnets, or a combination thereof. A non-contact coupling may help to avoid, or at least reduce, the risk of having liquid or humidity leaking from the core and damaging the drive. As lubricants may be dispensed due to less friction due to the non-contact coupling, a non-contact coupling may also help the apparatus to have a smoother operation and to transfer the energy from the drive to the shaft more efficiently.

In embodiments, at least one of the discs may be rotated with a hydraulic system or a pneumatic system. In embodiments in which a pneumatic system is provided to rotate a disc, a gas which can be introduced into the core may also be a gas which is used to drive the disc, and the core may be slightly under pressurized with respect to the pneumatic system. In this manner, leakage of the working liquid inside the core may be avoided or reduced due to the pressure difference between the core and the pneumatic system. If the gas from the pneumatic system enters the core, contamination may be avoided as the gas in the pneumatic system and inside the core is the same. In embodiments, two tanks of a same gas, such as an inert gas, may be provided. Gas from one of the tanks may be introduced into the core such that the gas is dissolved within the working liquid, while gas from the other tank may be used to drive the pneumatic drive. In embodiments, the pneumatic system may include a turbine and a compressor, such that the gas from the corresponding tank may be compressed and used to move the turbine, and therefore to move the corresponding shaft and disc.

In embodiments, a pitch of the holes of the first disc, the second disc, or a combination thereof can increases from a radially most inner channel towards a radially most outer channel of the respective disc. This arrangement can help to create a lower pressure at an outer radial portion of the discs, draw the working material to an inside of the core and accelerate the material, and to cause an angular rotational speed of the material between the discs to increase towards an outer radial direction of the core. Breaking down the material to a desired size may therefore be performed efficiently. Such a configuration may particularly be applicable to an apparatus having one or more discs with an opening close to a center of the discs for introducing the working liquid.

In embodiments, a size of the through-holes of the first disc, the second disc, or a combination thereof can decrease from a most radially inner portion towards a most radially outer portion of the respective disc. Similarly, this may help the working liquid to advance radially outwards, particularly in embodiments where the holes are blind holes.

In embodiments, the first disc and the second disc may include a ceramic material. In particular, the first disc and the second disc may be made of a ceramic material. A ceramic coating may be used, in other embodiments. For example, the discs may be made of a steel body and may be coated with a ceramic coating. Accelerating and reducing the size of a material such as iron (which may show magnetic effects) during the use of the core may be particularly difficult if the first and second discs for example include, or are made of, metallic materials. Using ceramic materials for the discs can help efficiently accelerate and reduce the size of such materials.

In embodiments, the core may further include a housing enclosing the first disc and the second disc. In embodiments, the housing may include one or more elements, such as conduits or tubes, for introducing one or more fluids, such as gases, which may be mixed with the working liquid. The housing of the core may also include one or more elements for adjusting one or more conditions in the core. For example, temperature and pressure within the core may be adjusted with suitable elements. These elements may also be provided separately from the core.

In embodiments, the core 10 further includes a housing 15 enclosing at least the first disc 11 and the second disc 12. The housing 15 may form a chamber in which the first disc 11 and the second disc 12 are arranged. Any suitable coupling between the discs 11, 12 and a shaft 14, and between the discs 11, 12 and the housing 15 may be provided.

In embodiments, at least one the discs 11, 12 may be rotatable. Both discs may be rotatable, or only one of the discs may be rotatable. If both discs are rotatable, they may be rotated in a same direction or in opposite directions. In embodiments, both discs can be rotated in opposite directions. In embodiments, the objective of the rotation of the disc(s) is to produce a water hammer effect and a cavitation effect, and to make the working liquid and the material collide. The collision, shock waves, and low pressure areas created due to cavitation can break down the material, raise the temperature of the liquid, and convert the liquid to gas, steam, or vapor.

In embodiments, the drives may be directly or indirectly connected to a corresponding shaft 14. In embodiments, a connection to a corresponding shaft may include a hydraulic coupling system, a pneumatic system, or a non-contact system, such as a magnetic coupling system. In the example of FIG. 1, a magnetic coupling 17 is provided between the drive 13 and the shaft 14. Bearings 9, for example ceramic bearings, may be provided. A drive 13 may be provided for rotating the shaft 14, and therefore rotating the corresponding disc.

In embodiments, the drive 13 may include an electric motor. The motor may be AC motor, a brushless DC electric motor, or in general any motor suitable for rotating the shaft 14. Other suitable actuators for rotating the shaft 14 at high speed may alternatively be provided. In embodiments, a gas turbine, an air turbine, or a steam turbine may be used as a drive. The one or more drives 13 may be arranged outside the core 10 and the coupling with the shaft 14 may be a non-contact coupling, for example a magnetic coupling, so as to avoid or at least reduce any contamination of the drive 13.

In the embodiment of FIG. 1, the first disc 11 and the second 12 disc are arranged in a horizontal configuration (rotation about a horizontal axis, wherein the axial direction is parallel to a horizontal direction). In other embodiments, the first 11 and second 12 discs may be arranged in a vertical configuration (rotation about a vertical axis), or in a different configuration.

In the embodiment of FIG. 1, the first disc 11 can include a central opening through which material can be introduced or drawn into the core 10. The second disc 12 does not include such opening in this embodiment, but an opening may include be included in other embodiments. In FIG. 1, the core 10 includes two exits 8 for the working liquid. In particular, the working liquid may be output along a radial direction of the core. In other examples, more or fewer exits may be provided, and the exits may be provided in any suitable location of the housing of the core.

FIG. 2 schematically illustrates a cross-section of an embodiment of the first disc 11 and the second disc 12 facing each other. The rings 16 and the channel portions 5 of the discs 11, 12 include holes 7. In this embodiment, the holes 7 are blind holes. The holes 7 are also inclined with respect to the axial direction. The first disc 11 includes a central opening 25 through which the working liquid is to be introduced between the first disc 11 and the second disc 12.

In embodiments, the rings 16 include a ring base 21 and side walls. In embodiments, the holes 7 open in the ring bases 21. In embodiments, the channels 18 include a channel base 19 and side walls. In embodiments, the channel bases 19 of a disc are offset from the ring bases 21 of the disc along an axial direction of the disc, and therefore the core 10. A side wall of a ring 16 and a side wall of a channel 18 may be shared, that is, a single wall may form the side wall of the ring 16 and of the adjacent channel 18.

In embodiments, the ring bases 21 of the first disc 11 are offset 20 from the ring bases 21 of the second disc 12 along the axial direction of the discs. In embodiments, the gap 20 between both discs may be set appropriately for operation. The size of the gap 20 may, for example, be adjusted depending on the material to be processed, the size of material, and the desired size and properties of the material after processing. In embodiments, the gap 20 may be about 420 microns to about 1000 microns, such as about 420 microns, about 500 microns, about 600 microns, about 700 microns, about 800 microns, about 900 microns, about 1000 microns, or any value contained within a range formed by two the preceding values. If the apparatus includes a plurality of cores, a gap 20 between a pair of discs may be about 4 mm for the first pair of discs through which the material is passed through.

Figure 3:
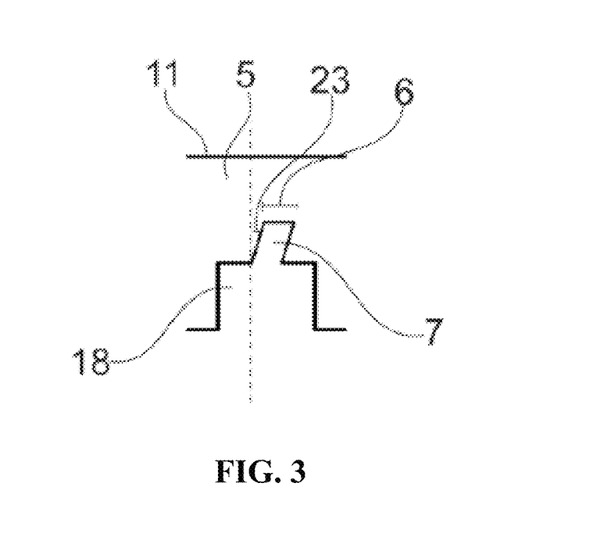
FIG. 3 schematically illustrates an enlarged view of a channel portion and a channel of the first disc of FIG. 2, according to an embodiment of the present disclosure.

FIG. 3 schematically illustrates an enlarged view of a channel portion 5 and a channel 18 of the first disc 11. In embodiments, the hole 7 forms an angle 23 with respect to the axial direction. In general, the holes 7 of the discs form an angle of about 2° to about 89° with the axial direction. An angle 23 of about 20° to about 80°, such as about 25° to about 75°, for example about 72°, may be particularly suitable for achieving and enhancing the water hammer and cavitation effects. The angle 23 chosen may depend on the initial size of the material, the desired size of the material after processing, and the identity of the material to be processed.

In embodiments, the holes may have a substantially elliptical cross-section. This cross-section refers to a cross-section perpendicular to the axial direction of a disc. An elliptical cross-section of the holes 7 may be particularly suitable for achieving and enhancing the water hammer and cavitation effects. Other shapes of a cross-section of a hole 7 may be possible. For example, a cross-section of a hole 7 may be oval, elliptic, oblong, or circular, in embodiments.

In embodiments, blind holes 7 may have a depth of about 2 mm to about 12 mm. The blind holes 7 may in embodiments be cone-shaped or semi-spherical. A radius of the blind holes 7 may be greater than or equal to about 2 mm. The dimensions of the blind holes, and in general of the holes regardless they are blind or not, may depend on the size (diameter and thickness) of a disc. Therefore, the dimensions of the holes may vary for discs having different sizes.

In embodiments, the inner dimensions of the hole 7, such as a width 6 of a hole 7, may be constant throughout its length, such as in FIGS. 2 and 3. In embodiments, the walls defining a hole 7 may be straight. In other embodiments, a size, such as a width 6 of a hole 7, may decrease. For example, a size of the holes 7 of the first 11 and/or the second 12 disc may decrease from a most radially inner portion towards a most radially outer portion of the respective disc.

In general, the shape and dimensions of the holes 7 may be adapted to the working liquid to be used, and in particular to the type and size of the material mixed with the working liquid.

In embodiments, the holes may extend at an angle of between 20° and 80° with respect to the axial direction, and specifically at an angle between 25° and 75°. These ranges of angles may work particularly well for promoting and enhancing the water hammer and the cavitation effects too. Additionally, an angle of the holes with respect to an axial direction may increase in a radially outward direction of one or both discs. The holes in the rings and the holes in the channel portions may have different inclinations, in embodiments.

In embodiments, the holes may be blind holes, that is, the hole does not extend through the corresponding disc. In embodiments, the working liquid (mixed with the material) may be drawn into the hole and expelled out. In these examples, the first disc, the second disc, or a combination thereof may further include an opening close to or in the center of the corresponding disc for introducing the working liquid between the first disc and the second disc. Therefore, when the first disc and/or the second disc are rotated, the working liquid may advance radially outwards.

In embodiments, the holes may be through holes. In such embodiments, the working liquid may be introduced into a housing of the core from a first axial side of the housing. The working liquid may then travel through the holes of the discs, such as through the first disc, from the first disc to the second disc, and through the second disc. The working liquid may also travel in the opposite direction, for example, through the second disc, towards the first disc, and through the first disc.

In embodiments, the shape and internal dimensions of the holes 7, an angle of inclination of the holes 7 with respect to an axial direction, and a pitch between the holes of a same ring 16 or channel portion 5 may be adapted for each ring 16 and channel portion 5. In particular, these parameters may be varied considering that a speed of a hole increases with an increasing distance to the center of the disc. For example, a pitch of the holes 7 of the first 11 and/or the second disc 12 may increase from a radially most inner portion towards a radially most outer portion of the respective disc.

In embodiments, the size of the holes (in particular in cross-section, such as an internal radius of the hole) of the first 11 and/or the second 11 disc may decrease from a most radially inner portion towards a most radially outer portion of the respective disc.

Figure 4:
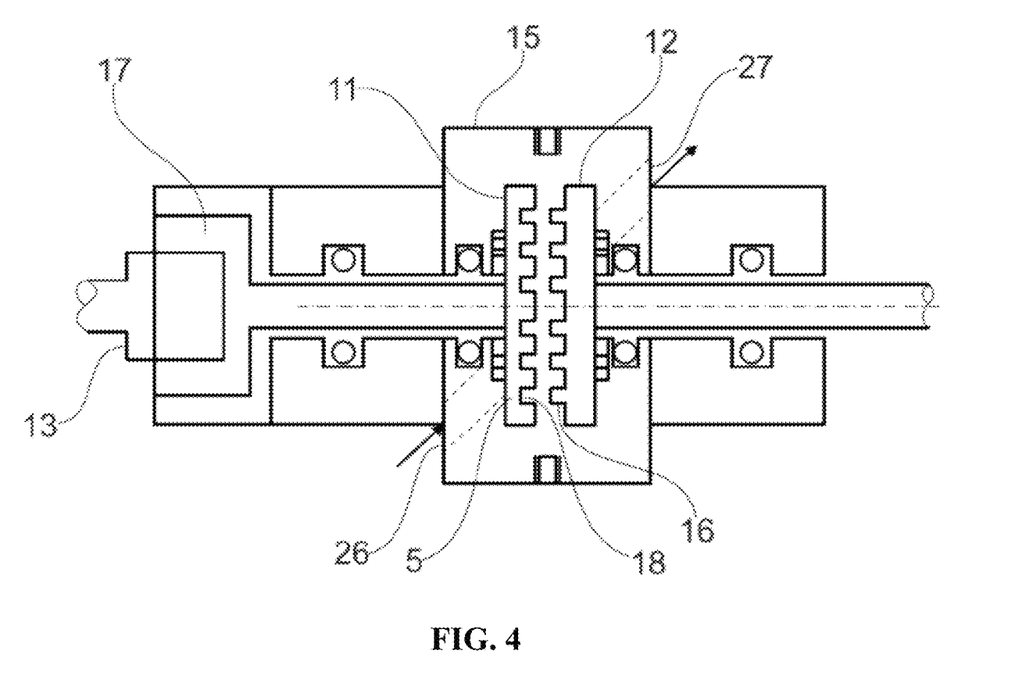
FIG. 4 schematically illustrates a cross-sectional view of another example of a core, according to an embodiment of the present disclosure.

FIG. 4 schematically illustrates a cross-sectional view of another example of a core 10. In this example, the holes are through holes such that the working liquid can flow axially through the first disc 11 and the second disc 12. As the holes are through holes, the working liquid may be inputted to the core 10 through a portion of the housing 15. In embodiments, the housing may have an inlet 26 at an axial side of the housing for introducing the working liquid. The housing may have an outlet 27 at an opposite axial side of the housing for removing the working liquid with the material of a smaller size. As shown in the example of FIG. 4, the inlet 26 and the outlet 27 may also be at opposite radial sides of the core, although this may be different in other examples.

Figure 5:
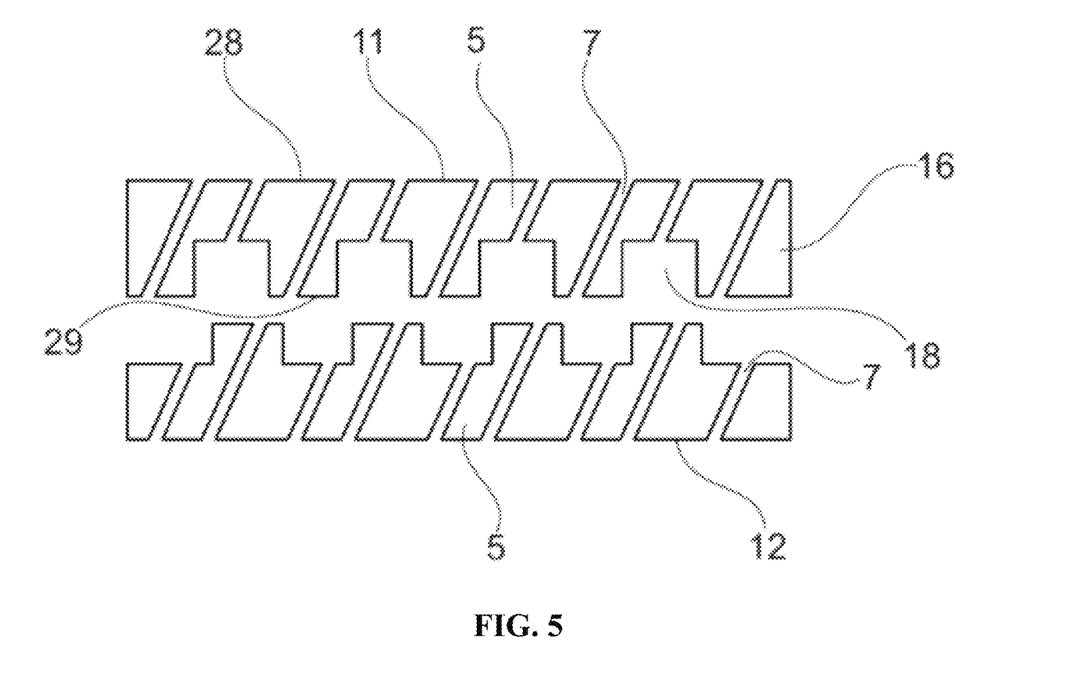
FIG. 5 schematically illustrates a cross-section of another example of a first disc and a second disc facing each other, according to an embodiment of the present disclosure.

FIG. 5 schematically illustrates a cross-section of another example of a first disc 11 and a second disc 12 facing each other. The rings 16 and the channel portions 5 of the discs 11, 12 include holes 7. In this example, the holes 7 are through holes. Therefore, the holes extend from an axial surface 28 of a disc to an opposite axial surface 29 of the disc. The holes 7 are also inclined with respect to the axial direction.

Regardless of whether the holes 7 are blind holes or through holes, in embodiments, the first disc 11 and the second disc 12 may include or may be made of a ceramic material. The first and the second disc may be coated with a ceramic material, in embodiments. This configuration may help to operate the apparatus effectively with materials which may exhibit magnetism. In embodiments, the discs may have a disc body made of steel, such as stainless steel, and a ceramic coating. In other embodiments, other materials for the disc body and for a coating, if present, may be used. For example, a disc may include a wolfram carbide coating, in embodiments.

During operation, the core may reach high temperatures, such as temperatures above about 100° C. In embodiments, a cooling system may be provided for cooling the core 10. For example, the housing may include conduits through which a suitable cooling fluid may be circulated.

In embodiments, the core 10 may be incorporated in an apparatus. A schematic example of an apparatus is provided in FIG. 6.

Figure 6:
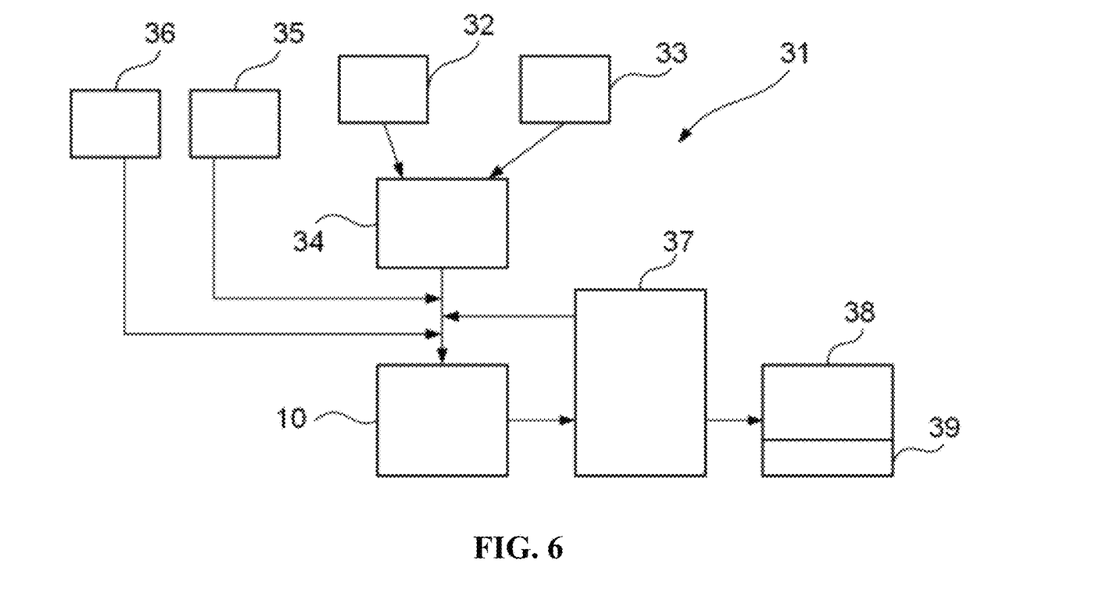
FIG. 6 schematically illustrates an apparatus comprising a core according to the disclosure, according to an embodiment of the present disclosure.

In embodiments, the apparatus 31 includes a core 10 as described throughout this disclosure and one or more inlets for introducing the working liquid and the material in the apparatus. In the example of FIG. 6, the working liquid and the material are introduced separately, as shown in the two separate containers 32, 33 for the working liquid and the material. The material may be provided in powder form, in embodiments. The apparatus may further include a mixing chamber 34 for mixing the material and the working liquid. Mixing may be performed with any suitable mixing element, such as any suitable stirrer, optionally a magnetic stirrer.

In embodiments, the material may therefore be drawn between the disc from one axial side of the core, from the other axial side of the core, or even from both axial sides of the core. In embodiments, elements for suitably introducing and outputting a material into and out of the core may be provided at the entrance and at the exit of the core. For example, tubes and valves may be provided. Other elements for helping to transport the material such as pumps may also be provided. For example, centrifugal pumps, membrane pumps, tesla pumps, the like, or combinations thereof may be used.

In embodiments, the apparatus 31 may be configured to dose the working liquid containing the material to be introduced in the core 10. The apparatus 31 may include a suitable system for dosing the working liquid. For example, one or more valves may be used. The apparatus may further include valves in other portions of the apparatus for regulating the flow of the working liquid through the apparatus.

In embodiments, the working liquid may be a dispersion or a slurry. The working liquid may include one or more gases, in embodiments. In these or other embodiments, one or more gases may be mixed with the working liquid inside the apparatus, for example inside the core. The working liquid may include or may be water, but other working liquids may also be used. For example, fuels such as diesel, biodiesel, and gasoline may also be used as working liquid. The material within the working liquid may be micron sized, that is, of a few or tens or hundreds of microns. The material may also have other suitable sizes, such as less than one micron. In embodiments, apparatuses having a single stage, that is a single pair of discs, may be able to operate with material smaller than 200 microns. If the apparatuses have more than one stage, the material may be millimeter sized. In embodiments, the working liquid may include mineral salts and/or biological material. In embodiments, the working liquid may include catalysts or additives, such as carbon, nickel, KOH, the like, and others. The apparatus of the current present disclosure may be able to operate with additional materials, a broader range of material sizes, and increased amounts of material than previously available technologies.

In embodiments, the working liquid and the material may be introduced in the apparatus together, wherein the working liquid and the material can be combined prior to introduction into the apparatus. In other embodiments, the working liquid and the material may be introduced separately into the apparatus, and mixed in the apparatus before feeding the mixture of the working liquid and the material to the core. In embodiments, the apparatus may include one or more mixing chambers in which the material may be mixed with the working liquid. A magnetic stirrer, or in general any suitable stirrer or element may be used to mix the working liquid and the material.

In embodiments, the apparatus may include a system for introducing one or more fluids (in the form of liquids or gases) for controlling or setting an atmosphere within a path of the apparatus through which the material is to travel. For example, the system may be configured to introduce a fluid into the apparatus for setting or modifying an atmosphere within the apparatus. A fluid such as nitrogen may help to maintain a controlled level of oxygen during the production of the nanoparticles. A fluid such as argon may help to create a controlled environment for certain processing conditions. Other suitable fluids may also be used. For example, the system may be configured to provide liquid nitrogen, which may help to achieve low temperatures. In embodiments, the system may include a vacuum pump for creating vacuum conditions. The example of FIG. 6 schematically illustrates a storage container 35 for a fluid and a vacuum pump 36.

In embodiments, the fluid may be introduced into different portions of the apparatus 31. For example, the fluid may be introduced in a conduit of the apparatus or in another portion of the apparatus. The fluid may also be directly introduced in the core 10.

In embodiments, the atmosphere may be conditioned before the working liquid containing the material is introduced into the core 10 for the first time. In embodiments, a vacuum may be applied, and then a fluid such as nitrogen or argon may be introduced in the apparatus 31. In embodiments, the working liquid may be introduced in the apparatus once a desired atmosphere has been created. For example, one or more fluids may be introduced in the apparatus, such as in a conduit thereof, for controlling an atmosphere through the travel path of the working liquid and the material. In embodiments, the same or a different fluid may be directly introduced in the core 10 once the working material is inside the apparatus, such as inside the core.

In embodiments, the apparatus 31 may also include one or more drives 13 for rotating at least one of the first disc 11 and the second disc 12. A drive may, for example, be a motor.

In embodiments, the apparatus 31 may further include a system for generating a vacuum for removing the working liquid with material of smaller size from the core 10. In particular, the system may be configured to create a vacuum in an outlet of the core 10.

In embodiments, the material which has been reduced to a smaller size may be separated from the working liquid after leaving the core 10. The apparatus 31 may include a system 37 for separating the material from the working liquid. An example of such a system may be a centrifugal separator, though other suitable systems may also be used. It is to be noted that the liquid may have been completely or to partially converted to gas.

In embodiments, system 37 may be configured to separate the material by size or density. In embodiments, the system 37 may separate the material within the working liquid in two or more groups according to the size or density of the material.

In embodiments, the system 37 for separating the material from the working liquid and the system for generating a vacuum for removing the working liquid and the material from the core 10 may be the same.

In embodiments, after leaving the core 10, the material may include a portion of nanoparticles which have a desired size and are therefore ready to be collected, and may include a portion of nanoparticles or material of a larger size which have not yet reached the desired size. In embodiments, the nanoparticles which are ready may be directly removed from the apparatus 31. In embodiments, the apparatus 31 may include a system 38 configured to collect the nanoparticles which have reached a desired size. Such a collection system 38 may include an element configured to draw the nanoparticles towards an inside of the system 38. The nanoparticles may for example go from the centrifugal separator 37 to the collection system 38. In embodiments, the system 38 may include a storage element 39, from which the nanoparticles may be removed. In embodiments, the storage element 39 may be removable from the collecting system 38.

In embodiments, the portion of the material which has not reached a desired size may be directed to the core 10 to be collided again, such as from the centrifugal separator 37. The apparatus 31 may be configured for this purpose. In embodiments, the working liquid may also be directed to the core 10 after it has been separated from the material.

In embodiments, the nanoparticles of the material may be processed further after they have been produced. In embodiments, the nanoparticles may be directly packed after their production. The apparatus 31 may include a suitable system for packing the nanoparticles in a suitable manner. For example, the apparatus 31 may include a container-based system, including for example glow boxes, for packing the produced material. In embodiments, the apparatus may be arranged in a clean room. The clean room may include one or more systems for controlling the quality of the air, for example for filtering the air. Blankets such as water blankets may be provided for air filtration.

In embodiments, the apparatus may further include a plurality of valves. The valves may regulate the passage of the working fluid through a path of the apparatus. In embodiments, the apparatus may further include one or more pumps for moving the working fluid through the apparatus. For example, centrifugal pumps, membrane pumps, tesla pumps, or combinations thereof may be used. In embodiments, the apparatus may further include one or more pressure compensators, and/or one or more pressure expanders.

In embodiments, the apparatus may further include one or more heaters such as microwave heaters, plasma heaters, or induction heaters. In embodiments, one or more heaters may be provided in the separator system 37 for helping to dry the material.

In embodiments, the apparatus may include one core or a plurality of cores. The core may therefore be referred to as a single stage core (one core) or a multistage core (plurality of cores). If the core is a multistage core, there may be a plurality of pairs of discs, each pair including a first disc and a second disc as described herein. In embodiments, all the first discs may be driven using a single actuator/drive such as a motor, and all the second discs may be driven by another actuator, such as another motor. When the apparatus includes more than one core, the working liquid may be circulated through each of the cores in sequence for achieving a desired particle size and distribution. The apparatus may be configured such that the working liquid may be directly collected from each of the cores, in embodiments. In embodiments, it may also be possible to selectively direct and accelerate the working liquid into specific cores, without having to circulate the working liquid through all of the cores available.

Figure 7:
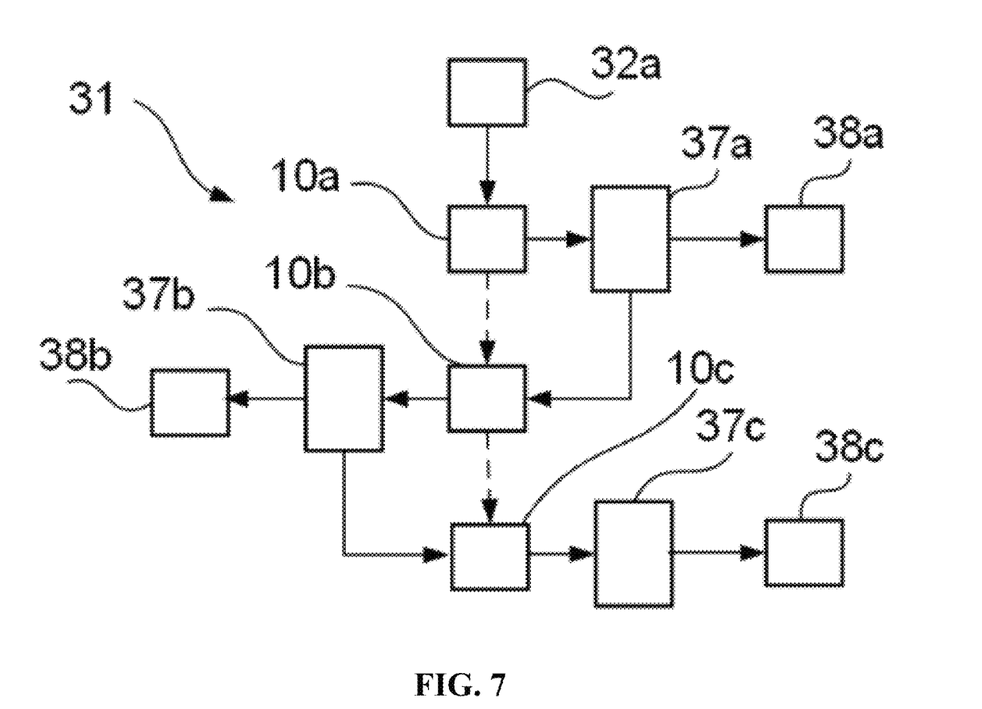
FIG. 7 schematically illustrates another example of an apparatus, the apparatus comprising a plurality of cores, according to an embodiment of the present disclosure.

In embodiments, the apparatus may include more than one core. FIG. 7 schematically illustrates an example of an apparatus 31 which includes a plurality of cores 10, in particular three cores. Therefore, three stages may be provided: at the first stage, the working liquid including material can be introduced into a first core 10a. Once the material has been made smaller, the working liquid can be introduced into a first centrifugal separator 37a. The material which has a desired size can be collected at a first collector system 38a. At the second stage, the material from the first stage which has not achieved a desired size and remaining working liquid can be introduced into a second core 10b. The working liquid with the material can then be passed through a second centrifugal separator 37b. The material which has reached a desired size can be collected at a second collector system 38b. At the third stage, the material not yet having a desired size can be introduced into a third core 10c with the remaining working liquid from the centrifugal separator 37b. The material can then be separated from the working liquid once more in a third centrifugal separator 37c. The material which is ready can be collected in a third collector system 38c. A plurality of drives such as electric motors may be used for rotating the first and second discs of each core.

In embodiments, the working liquid may be circulated through some or all of the available cores. In embodiments, if necessary, after the working liquid has been circulated through all the available cores, the working liquid may be circulated through one or more of the cores again. Likewise, the nanoparticles may be collected after passing the working liquid through a corresponding core. For example, the working liquid may be circulated through more than one core before the nanoparticles are collected (see for example the dashed lines of FIG. 7).

In embodiments, the apparatus 31 may include or may be connected to one or more storage containers 32a that can store the working liquid and the material, either jointly or separately. In the example of FIG. 7, a single container 32a including the working liquid and the material is provided.

In embodiments, one or more of the centrifugal separators 37a, 37b, 37c, or an additional centrifugal separator arranged after the third centrifugal separator 37c, may include a plurality of ultrasound generators. The ultrasound generated by the ultrasound generators may help to palletize the produced nanoparticles. A pallet may have dimensions of a few microns, such as a length of less than or equal to 20 microns, in embodiments. A plurality of pallets may be stored in a cartridge.

In embodiments, the apparatus 31 may further include a plurality of sensors, for example flow sensors, temperature sensors, humidity sensors, pressure sensors, and rotational speed sensors. The operation of the sensors may be controlled using a sensor control system. A control unit may control the operation of the apparatus 31 during the production of nanoparticles based on real-time data obtained by the sensors.

Aspects of the apparatus of FIG. 7 may be applied and combined with the apparatus of FIG. 6, and vice versa. For example, one or more ultrasound generators may be included in the apparatus of FIG. 6 for palletizing the produced nanoparticles. In embodiments, one or more tanks with fluids for conditioning the atmosphere inside the apparatus may also be provided in the apparatus of FIG. 7.

Methods of Producing Nanoparticles

In embodiments, the core as described herein and the apparatus as described herein may be used to produce nanoparticles. Accordingly, there is provided a method of producing nanoparticles of a material in a working liquid which can include rotating the first disc, the second disc, or a combination thereof of the core of the apparatus as described herein; introducing the material and the working liquid into the core; accelerating the working liquid to cause a cavitation effect; and changing a flow direction of the working liquid to cause a water hammer effect; thereby producing nanoparticles of the material.

Figure 8:
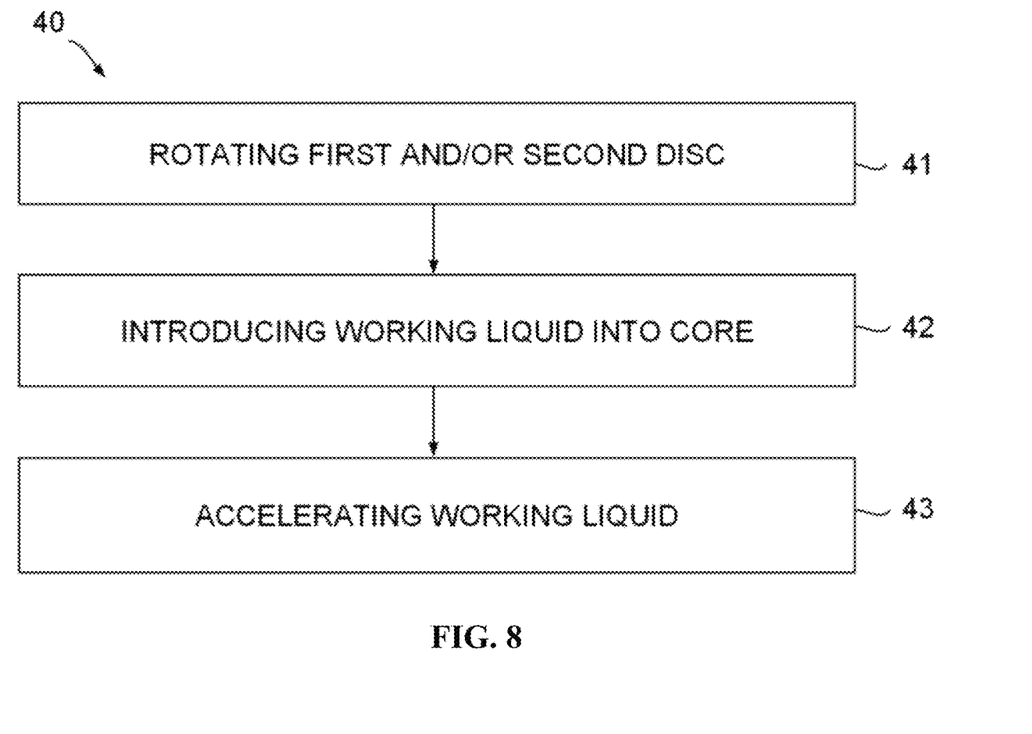
FIG. 8 schematically illustrates a flowchart of a method for producing nanoparticles with an apparatus according to the disclosure, according to an embodiment of the present disclosure.

The method is schematically illustrated in the flowchart of FIG. 8. The explanations and details provided before with respect to the core and the apparatus can be applied to the method, and vice versa.

In embodiments, the method 40 can include, at block 41, rotating the first disc 11 and/or the second disc 12 of a core 10 as described throughout this disclosure. The method can further include, at block 42, introducing a working liquid including a material into the core 10. The method can further include, at block 43, accelerating the working liquid to cause a cavitation effect and changing flow direction of the working liquid to cause a water hammer effect, thereby producing nanoparticles of the material.

In embodiments, the collisions between the material, as well as the pressure waves and bubble collapse due to the water hammer and cavitation effects, may help to effectively obtain the material in a smaller size, in particular nanoparticles of the material.

In embodiments, the steps of introducing 42 the working liquid in the core 10 and rotating 41 the first disc 11 and/or the second disc 12 may be performed one after the other or at overlapping periods of time, such as simultaneously. For example, one or more discs of the core may be rotated first for helping to introduce the working liquid in the core. In other embodiments, the working liquid may be introduced in the core first, and then one or both discs may be rotated.

In embodiments, the working liquid, optionally containing already the material, may therefore be introduced in the apparatus and guided to the core. In embodiments, the working liquid with the material of smaller size may be extracted from the core and guided away from the core through the apparatus.

In embodiments, the method may further include using a separator system for separating the material from the working liquid. Such a system may for example be a centrifugal separator. In embodiments, the system may be configured to generate a vacuum for removing the working material from the core. Other systems, such as a system including gravity separation or a system including electropotential separation (using static electricity), may also be used.

In embodiments, once the nanoparticles have reached a desired size, they may be removed from the apparatus. In embodiments, the nanoparticles may be collected in a collection system included in the apparatus, and then removed from the apparatus. The collection system may, in embodiments, include one or more glove boxes, such as hermetically sealed enclosures for ensuring stability, providing a controlled environment for the nanoparticles, and avoiding contamination. A collection system, which may include one or more valves, may be connected to the outlet of the separator system. If the apparatus includes a plurality of cores, a plurality of collection systems may be provided, and the collection systems may be connected to the outlets of a plurality of separator systems, such that nanoparticles may be collected and packaged, for example palletized, after the working liquid has been removed from each core.

In embodiments, the method may include passing the material through the core more than once. If after a colliding process in the core, there is material which does not have the desired dimensions, the material which does not yet have the desired size may be directed through the core again. This process may be repeated a plurality of times.

In embodiments, the method may further include generating a vacuum or reduced pressure for removing the working liquid from the core once the material has a smaller size. After passing through the core, the liquid may have a high proportion of gas, vapor, or steam. A suitable and efficient manner for removing the working liquid and/or gas from the core may include the use of a vacuum. A vacuum may herein be regarded as a significantly lower pressure than the working pressure in the core.

In embodiments, a vacuum may also be generated for preparing an atmosphere inside the apparatus before introducing the working liquid. For example, an inside of the apparatus may be washed and then vacuum may be applied for achieving a suitable atmosphere in the apparatus before introducing the working liquid. In embodiments, one or more gases, such as inert gases, may be introduced into the apparatus for preparing the atmosphere. In embodiments, the level of oxygen inside the apparatus may also be controlled.

In embodiments, the method may further include controlling or setting an atmosphere within a path of the apparatus through which the working liquid is to travel. For example, the system may be configured to introduce a fluid, such as a liquid or a gas, into the apparatus for modifying an atmosphere within the apparatus. Introducing nitrogen may help to regulate a level of oxygen within the apparatus. Argon is another fluid which may help to create a desired and controlled environment, in embodiments. In embodiments, the system may additionally or alternatively be configured to create vacuum within the apparatus. For example, a vacuum pump may be provided. A controlled suitable atmosphere for the production of nanoparticles may be achieved. In embodiments, the apparatus may further include a drying system and/or a dehumidifying system.

In embodiments, the method may further include using a controller configured to control, manage, or coordinate the operation of the apparatus. In embodiments, the controller may have one or more processors and one or more memories with instructions which may be executed by the one or more processors. In embodiments, the apparatus may further include a plurality of sensors which may be communicatively coupled (through wires or wireless) to the controller. Examples of sensors may be temperature sensors, humidity sensors, pressure sensors, or combinations thereof. In embodiments, the measurements of the sensors may help to precisely control and adjust the operation of the apparatus in real time.

In embodiments, the method can further include producing hydrogen gas. In embodiments which include producing hydrogen, the working liquid may be water, such as seawater, and the material may be an oxidizable metallic material. In embodiments, the apparatus may be configured to generate hydrogen ($H_2$) inside it. An example of the use of an apparatus to generate hydrogen can be found in European Patent Application No. 23383307, which has been filed as U.S. patent application Ser. No. 18/589,002, both of which are incorporated by reference herein in their entirety. In embodiments, hydrogen gas and nanoparticles may be simultaneously produced. Colliding the material, which may include an oxidizable metallic material, may activate the material such that the produced nanoparticles are able to react with water molecules, in particular without adding a base such as potassium or sodium hydroxide (KOH and NaOH). Alkaline water may also be used but is not required. An oxidizable metallic material as described herein may include both metals such as iron, aluminum, calcium, magnesium, zinc, and the like, as well as metalloids such as silicon. In embodiments, the oxidizable metallic material may further include a non-metallic compound. In embodiments, the oxidizable metallic material may include oxides of the metals or metalloids described herein. For example, the oxidizable metallic material may include $Al_2O_3$, $FeO_2$ or MgO.

In embodiments, the reaction between the material, which can include a metal, and water may produce a hydroxide in addition to hydrogen gas. By colliding the metals, or other suitable oxidizable metallic materials, in presence of water, hydroxides may be obtained. For example, for aluminum, calcium, magnesium, and zinc, the following reactions with water may occur, respectively:

$$2Al+6H_2O \rightarrow 2Al(OH)_3+3H_2$$

$$Mg+2H_2O \rightarrow Mg(OH)_2+H_2$$

$$Ca+2H_2O \rightarrow Ca(OH)_2+H_2$$

$$Zn+2H_2O \rightarrow Zn(OH)_2+H_2$$

In embodiments, additives may be added for improving the reaction between the oxidizable metallic material and the water. For example, the addition of additives including silicon, graphene, activated carbon, or combinations thereof may help to improve the reaction between the material and the water. Such additives may also be included in the oxidizable metallic material. For example, the oxidizable metallic material may include nano-sized activated carbon or graphene. An oxidizable material may herein refer to a material which is capable of removing and capturing oxygen from a water molecule, such that hydrogen is produced in the process. Other additives that may be used are, for example, iron nanoparticles or nickel.

In embodiments, the use of nickel may help to weaken the bonds between the hydrogen and the oxygen of the water molecules due to bonding of the nickel to the hydrogen atoms of the water molecules. Nickel may therefore help to promote the reaction between the oxidizable material and the water molecules. Additionally, nickel may help to break the water molecules, wherein the hydrogen atoms remain attached to the nickel. Accordingly, the hydrogen production may also be enhanced.

In embodiments, nickel may be introduced in the core in powder form. In other embodiments, nickel may be attached to an inside of the apparatus. For example, strips or other suitable elements including nickel, made of nickel, or coated with nickel may be attached to the apparatus. A suitable location may be at the outlet of the core, such that the working liquid (which can include water) and the nanoparticles of the material after traveling through the core may be passed and contacted with the nickel.

Therefore, in embodiments, an oxidizable material may be collided for obtaining nanoparticles which may react with water, for example seawater, without the need to use further reactants. Such a reaction may effectively produce hydrogen. For example, if silicon is used, the nanoparticles of silicon produced may undergo the following reaction: $Si+4H_2O \rightarrow Si(OH)_4+2H_2$. Hydrogen gas is therefore produced. The silanol functional groups (Si—OH) of the orthosilicic acid ($Si(OH)_4$) may then form siloxane bonds (Si—O—Si) and release water: $2Si(OH)_4 \rightarrow (OH)_3Si-O-Si(OH)_3+H_2O$. Subsequently, the released water molecules may react with the silicon nanoparticles which have not reacted yet, sustaining the production of hydrogen gas until the silicon nanoparticles have been consumed: $4H_2O+Si \rightarrow Si(OH)_4+2H_2$.

In embodiments, the chemical reactions above may cause the pH to decrease, and a decrease in pH can increase the kinetics of the reaction. For example, a pH below 5 may help to speed up the process as well as to increase the reactivity of the silicon nanoparticles. However, this reactivity will depend on which additive(s) in which amount (if additives are added at all). It may also be possible that the pH increases, in embodiments. In embodiments, an acidic solution, such as one including orthosilicic acid ($Si(OH)_4$), may be added to accelerate the process for generating hydrogen gas.

Besides seawater, water such as tap water, deionized water, extra pure water, grey water, waste water, contaminated water, sewage water, water including oil, or other types of water may be used in the present method.

In embodiments, hydrogen may be produced in the separator system, for example in a centrifugal separator. The hydrogen may be collected from the top of the centrifugal separator and a remaining liquid may be collected from the bottom of the centrifugal separator. Remaining material and working liquid may be directed to the core. Hydrogen may also be produced in, and collected from, the core, in embodiments.

Although not necessary, a hydroxide compound such as KOH or NaOH may be used to trigger or initiate hydrogen production. This addition may accelerate the process, as the reaction between water and the oxidizable metallic nanoparticles will start more quickly. As KOH or NaOH may only be used to initiate the reaction, and not to keep the reaction ongoing, a small or catalytic amount of KOH or NaOH may be sufficient.

In embodiments, pressure waves generated within the working liquid due to the water hammer effect may rapidly change the speed of the working liquid and create turbulent flows. When the oxidizable material, such as silicon, is subjected to the pressure waves, the oxidizable material may break apart and mix effectively with the working liquid, enhancing contact between the oxidizable material and the water. The reaction between the oxidizable material and the water to produce hydrogen gas may be increased, as the oxidizable material would be dispersed and exposed to the water molecules.

In embodiments, the collapse of the bubbles formed in the working liquid generates localized regions of high pressure and temperature. This high temperature may help to trigger and accelerate the reaction between water and the oxidizable material. The bubble collapse also releases a high amount of energy in the form of shockwaves. This energy may also help to trigger the reaction between the oxidizable material and the water molecules. In embodiments, the following reaction may occur due to the high temperature and high pressure conditions: $Si+2H_2O \rightarrow SiO_2+2H_2$. Additionally, in embodiments, bubble collapse may help to break down the oxidizable material and to expose more surface area of the material which is then available for reacting with water. In addition, bubble collapse may generate strong hydrodynamic shear forces which may remove outer layers of the oxidizable material. The exposed inner layers may react more easily with the water molecules, enhancing the production of hydrogen gas. In embodiments, pressure waves and bubble collapse may increase the collisions between the oxidizable material, accelerating its reduction to a smaller size.

The water hammer and cavitation effects can work synergistically to create favorable conditions for hydrogen production. The water hammer effect may induce turbulent flows and help to mix the oxidizable material with water, which may prepare the water and the oxidizable material for receiving the shock waves produced by the bubble collapse. These shock waves may further enhance mixing and reactivity, creating a beneficial environment for efficiently generating hydrogen gas.

It should also be noted that nanoparticles suitable for producing hydrogen with the apparatus described herein may also be used to produce hydrogen outside the apparatus. For example, the nanoparticles may be mixed with water, such as seawater, for producing hydrogen in a suitable container outside the apparatus. For example, a reactor may be used for producing the hydrogen. The reactor may be operatively connected to the apparatus in embodiments.

In embodiments, the apparatus described herein may also be used for other purposes, such as generating other gases besides hydrogen. For example, a gas generated during the process may be or may include syngas, methane ($CH_4$), carbon monoxide (CO), carbon dioxide ($CO_2$), oxygen ($O_2$), hydrocarbon gas, and others.

For example, the core and apparatus may be configured to produce syngas from coal and water, emulating a water-gas shift reaction. In embodiments, a gas such as CO may be added to the water for producing a water-gas shift reaction, in which CO reacts with $H_2O$ for producing $CO_2$ and $H_2$. Methane ($CH_4$) and other carbon-based fuels may also be introduced in the apparatus. For example, $CH_4$ may be added to the water for producing $CO_2$ and $H_2$. In other examples, $CO_2$ may be used, together with water, to produce CO. Syngas may efficiently be generated. Catalysts such as calcium and copper-silicon may help to enhance the efficiency of producing CO from $CO_2$.

In embodiments, the apparatus may therefore be used to generate gases such as syngas or hydrogen in which the nanoparticles obtained may be used subsequently for other applications.

It should be noted that in examples where a gas is added to, or mixed with, the working liquid, the working liquid may include the gas before it is introduced in the apparatus, or the gas and the working liquid may be introduced in the apparatus separately and mixed within the apparatus, for example in the core. In embodiments, the apparatus may include one or more inlets through which one or more gases may be introduced in the apparatus, optionally in the core.

In embodiments, the apparatus described herein may also be used for liquefying coal by hydrothermal liquefaction (HTL). Coal and water may therefore be added to the core of the apparatus. Therein, the coal and the water may be subjected to high pressure and high temperature. This temperature may break up the coal into simpler organic compounds, and the solid coal and water may form a coal slurry. In embodiments, the coal may therefore be liquefied. Depending on which additional elements are added with the coal, other products such as biodiesel, including methanol or ethanol, may be obtained.

As oils and bio-oils, such as those which have already been used in other processes, include a significant amount of carbon and hydrogen, adding them with the coal may help to increase the yield of the corresponding product. Catalysts, for example biodiesel or methanol, may help to expedite the liquefaction process and promote the conversion of coal and other additional elements into liquid products.

In embodiments, alcohol sources such as methanol or ethanol may be included in the core with the coal. The high temperature and high pressure inside the core may promote the formation of liquid fuels in embodiments which include methanol or ethanol.

In embodiments, after HTL, the obtained product, which may be a slurry, may be refined. Separation techniques, for example distillation, may be used to purify the obtained product.

Particular aspects, embodiments and elements of aspects or embodiments disclosed herein can be combined together in any number and order to form new aspects and embodiments that form part of this disclosure.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only and is not intended to limit the scope. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "including" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "including" means "including, but not limited to."

As used herein, the term "about" means plus or minus 10% of the numerical value of the number with which it is being used. For example, "about 50%" means in the range of 45-55%, and also includes exactly 50%. That is, any value herein modified by "about" also discloses the value itself.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 compounds refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. An apparatus for producing nanoparticles of a material in a working liquid, comprising:
   one or more inlets for introducing the working liquid, the material, or a combination thereof into the apparatus;
   a core for accelerating the working liquid and the material, wherein the core comprises:
      a first disc and a second disc facing the first disc in an axial direction; wherein the first disc and the second disc each comprise:
         a plurality of concentric rings;
         a plurality of concentric channels alternately interleaved with the plurality of concentric rings;
         a plurality of holes extending from the plurality of concentric channels and the plurality of concentric rings at an angle of 2° to 89° with respect to the axial direction;
      wherein the plurality of concentric rings of the first disc are arranged facing the plurality of concentric channels of the second disc;
      wherein the plurality of concentric rings of the second disc are arranged facing the plurality of concentric channels of the first disc; and
   one or more drives for rotating the first disc, the second disc, or a combination thereof.

2. The apparatus of claim 1, wherein the plurality of holes each have a substantially elliptical cross-section.

3. The apparatus of claim 1, wherein the plurality of holes extend at an angle of 20° to 80° with respect to the axial direction.

4. The apparatus of claim 1, wherein the plurality of holes are blind holes.

5. The apparatus of claim 1, wherein the plurality of holes are through holes.

6. The apparatus of claim 1, wherein the first disc, the second disc, or a combination thereof further comprise an opening for introducing the working liquid between the first disc and the second disc.

7. The apparatus of claim 1, wherein the one or more drives are configured to rotate the first disc in a first direction and the second disc in a second direction opposite to the first direction.

8. The apparatus of claim 1, further comprising a separator system for separating the nanoparticles from the working liquid.

9. The apparatus of claim 8, further comprising a collector system configured to collect the nanoparticles after separation of the nanoparticles from the working liquid.

10. The apparatus of claim 1, wherein a pitch of the plurality of holes of the first disc, the second disc, or a combination thereof increases from a radially most inner portion towards a radially most outer portion of the respective disc.

11. The apparatus of claim 1, wherein a size of the holes of the first disc, the second disc, or a combination thereof decreases from a most radially inner portion towards a most radially outer portion of the respective disc.

12. The apparatus of claim 1, wherein the first disc, the second disc, or a combination thereof comprise a ceramic material.

13. A method of producing nanoparticles of a material in a working liquid, comprising:
introducing the material and the working liquid into the core of an apparatus comprising:
a core for accelerating the working liquid and the material, wherein the core comprises:
a first disc and a second disc facing the first disc in an axial direction;
wherein the first disc and the second disc each comprise:
a plurality of concentric rings;
a plurality of concentric channels alternately interleaved with the plurality of concentric rings;
a plurality of holes extending from the plurality of concentric channels and the plurality of concentric rings at an angle of 2° to 89° with respect to the axial direction;
wherein the plurality of concentric rings of the first disc are arranged facing the plurality of concentric channels of the second disc;
wherein the plurality of concentric rings of the second disc are arranged facing the plurality of concentric channels of the first disc;
rotating the first disc, the second disc, or a combination thereof of the core;
accelerating the working liquid to cause a cavitation effect; and
changing a flow direction of the working liquid to cause a water hammer effect;
thereby producing nanoparticles of the material.

14. The method of claim 13, wherein the material comprises an oxidizable metallic material.

15. The method of claim 13, wherein the material comprises silicon, aluminum, calcium, magnesium, iron, zinc, or combinations thereof.

16. The method of claim 13, wherein the working liquid comprises water.

17. The method of claim 13, further comprising generating hydrogen.

18. The method of claim 13, further comprising generating syngas, methane, carbon monoxide, carbon dioxide, oxygen, or combinations thereof.

19. The method of claim 13, further comprising setting an atmosphere inside the core.

20. The method of claim 13, further comprising adding one or more additives to the working liquid and the material.

* * * * *